No. 878,380. PATENTED FEB. 4, 1908.
H. GREENLAND.
HARNESS HOOK.
APPLICATION FILED MAR. 13, 1906.
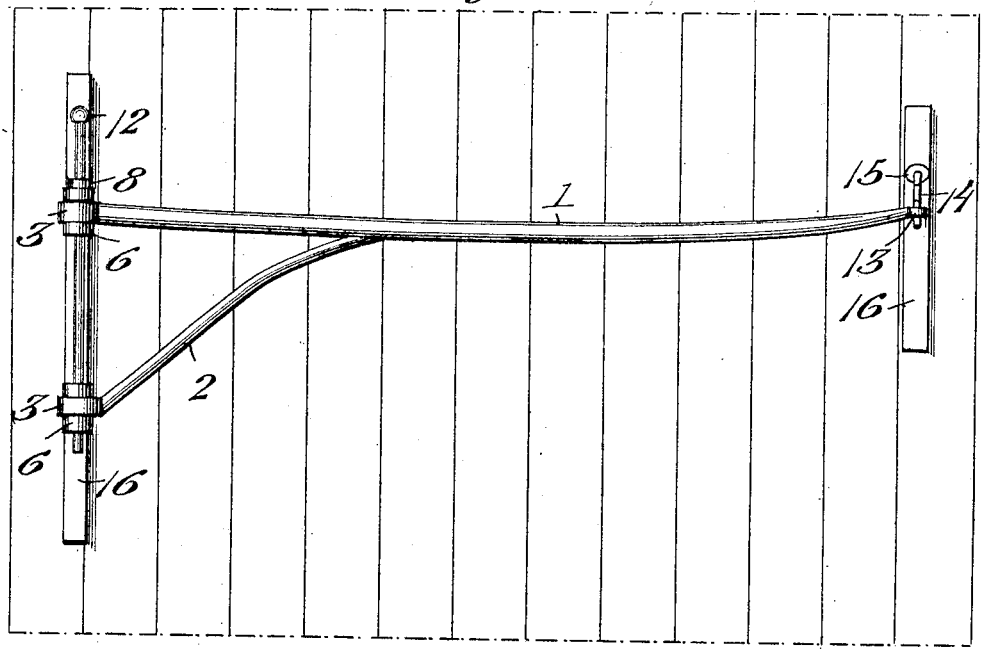
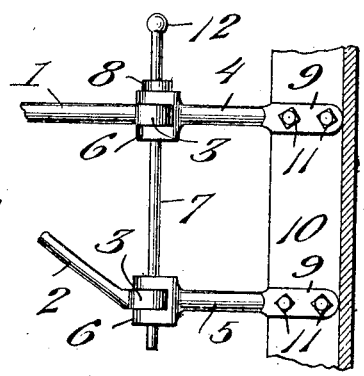
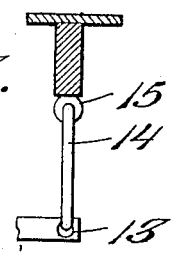
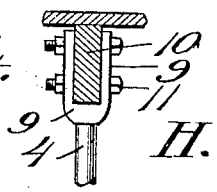
WITNESSES:
Phil. O. Barnes
P. M. Smith
INVENTOR
H. Greenland.
By Victor J. Evans
Attorney.

UNITED STATES PATENT OFFICE.

HERSCHEL GREENLAND, OF HELENA, OKLAHOMA.

HARNESS-HOOK.

No. 878,380.  Specification of Letters Patent.  Patented Feb. 4, 1908.

Application filed March 13, 1906. Serial No. 305,902.

*To all whom it may concern:*

Be it known that I, HERSCHEL GREENLAND, a citizen of the United States, residing at Helena, in the county of Woods and State of Oklahoma, have invented new and useful Improvements in Harness-Hooks, of which the following is a specification.

This invention relates to harness hooks, the object of the invention being to provide a harness hook or support which may be mounted in a stable or barn so as to swing towards and away from the wall or studding thereof and form an effective support or rack for the harness placed thereon, holding the same close to the wall and preventing the dislodgment of the harness therefrom, a suitable keeper being employed in connection with the hook or support for preventing the same from swinging outward from the wall by accident.

With the above and other objects in view, the nature of which will more fully appear as the description proceeds, the invention consists in the novel construction, combination and arrangement of parts, hereinafter more fully described, illustrated and claimed.

In the accompanying drawings, Figure 1 is a front elevation of a harness hook or support embodying the present invention shown in its folded position. Fig. 2 is a detail elevation of the same, showing the hook swung outward away from the wall. Fig. 3 is a detail section, showing the keeper engaging the point of the hook for holding the same toward the wall. Fig. 4 is a detail horizontal section, showing the manner of bolting the hook supporting bracket arm to the studding.

The main body 1 of the hook may be of any desired length and is sufficiently stout to support various pieces of harness thereon, said hook having its body portion curved downwardly to prevent the harness from slipping off of its outer end. Extending downward from the rear portion of the hook or support 1 is an angular or inclined brace 2 and said brace, as well as the inner end of the hook 1, is provided at its extremity with an eye or knuckle 3 to receive the hinge pin by means of which the hook as a whole is connected to a side wall or other support. Extending outward from the wall or studding are bracket arms 4 and 5, each of which is provided at its outer end with a slotted head 6 in which one of the knuckles 3 of the harness hook is received, the slotted heads 6 being provided with openings in line with the openings of the knuckles 3 to receive a vertical hinge pin or bolt 7, the latter being provided with a collar or shoulder 8 which bears against the top of the upper head 6 and prevents the pin dropping out of place. Under the preferred construction, each of the bracket arms 4 and 5 is provided with a slotted base or bifurcated inner end, as shown at 9, the same being adapted to straddle the studding shown at 10 and to receive fastening bolts 11 which are inserted through the bifurcated inner end of the supporting arm and also through the studding 10, as illustrated in the drawings. The hinge pin 7 is extended a considerable distance above the upper bearing of the harness hook to form a guard which will prevent the harness from slipping off the heel or inner end of the hook proper, the said guard extension of the hinge pin being by preference, provided with an enlargement or head 12 which aids in preventing the harness from becoming dislodged from the hook.

At its outer end the main body 1 of the harness hook is provided with an eye 13 adapted to receive the extremity of a keeper 14 preferably in the form of a hook pivotally connected at 15 to the studding, as shown in Fig. 3, or to any other convenient point of the wall of the stable or barn in which the harness hook as a whole is mounted.

The harness hook hereinabove described is preferably connected to the studding of a barn or stable, but where no such studding is employed, strips 16 may be fastened to the wall as shown in Fig. 1 to provide for the necessary space or distance between the main body of the hook and such wall. By disengaging the keeper 14 from the extremity of the harness hook, the latter may be swung outward to enable the harness to be readily removed therefrom and replaced thereon, after which the hook is swung inward and locked in place by means of said keeper.

I claim:

A device of the character described comprising bracket arms with inner bifurcated attaching ends and having slotted heads with perforations at their outer ends, a downwardly curved harness hook having a brace secured to its under surface, the inner ends of the hook and brace being provided with knuckles having perforations to engage respectively the slotted heads of the bracket arms, a headed pin having a collar secured thereon, said pin serving to have one portion of its length inserted through the perforations of the bracket arms and through the perforations of the knuckles and said pin serving to project above the collar to prevent rearward displacement of harness when mounted on said hook, substantially as described.

In testimony whereof, I affix my signature in presence of two witnesses.

HERSCHEL GREENLAND.

Witnesses:
  JOHN ALLEN,
  WILLIAM WALAS RIGGEN.